(12) United States Patent
Palmer et al.

(10) Patent No.: US 7,082,145 B2
(45) Date of Patent: Jul. 25, 2006

(54) PULSE LASER RESONATOR

(75) Inventors: Jason Palmer, London (GB); David R. Klug, London (GB); Ian P. Mercer, London (GB); Daniel A. Allwood, Durham (GB)

(73) Assignee: Powerless Limited (GB)

( * ) Notice: Subject to any disclaimer, the term of this patent is extended or adjusted under 35 U.S.C. 154(b) by 0 days.

(21) Appl. No.: 11/347,685

(22) Filed: Feb. 3, 2006

(65) Prior Publication Data

US 2006/0140243 A1   Jun. 29, 2006

Related U.S. Application Data

(63) Continuation of application No. 10/380,655, filed as application No. PCT/GB01/04118 on Sep. 13, 2001, now Pat. No. 7,031,352.

(30) Foreign Application Priority Data

Sep. 13, 2000  (GB) .................................. 0022476.6
Sep. 13, 2000  (GB) .................................. 0022478.2
Sep. 13, 2000  (GB) .................................. 0022480.8
Sep. 13, 2000  (GB) .................................. 0022481.6
Sep. 13, 2000  (GB) .................................. 0022482.4

(51) Int. Cl.
   *H01S 3/10* (2006.01)

(52) U.S. Cl. .............................. 372/9; 372/12; 372/92; 372/99; 372/100; 372/106

(58) Field of Classification Search ..................... 372/9, 372/12, 92, 99, 100, 106
See application file for complete search history.

(56) References Cited

U.S. PATENT DOCUMENTS

| 3,564,454 A |   | 2/1971  | Hook et al. |
| 3,928,818 A |   | 12/1975 | White |
| 4,053,851 A | * | 10/1977 | Krupke ........................... 372/4 |
| 4,208,636 A | * | 6/1980  | German ......................... 372/42 |
| 4,337,442 A |   | 6/1982  | Mauck |

(Continued)

FOREIGN PATENT DOCUMENTS

EP          0200889 A2    11/1986

(Continued)

OTHER PUBLICATIONS

G. Benedetti Michelangeli and E. Penco; G. Guiliani and E. Palange, Q switching and cavity dumping of a high-power cw Nd:YAG laser by means of a novel electro-optic configuration, Optics Letters, Vo. 11, No. 6, Jun. 1986, Optical Society of America.

(Continued)

*Primary Examiner*—Min Sun Harvey
*Assistant Examiner*—Delma R. Flores Ruiz
(74) *Attorney, Agent, or Firm*—Reinhart Boerner Van Deuren s.c.

(57) ABSTRACT

A laser is disclosed which includes a gain medium, a switch element, and a pulse controller. In one embodiment laser light of differing polarizations pass along respective paths and a pulsed laser output is generated via an electro-optical element. In another embodiment light of differing polarizations passes in differing directions through a cyclical path. The invention can make use of a prism-shaped polarizer having a polarization selection face and two further faces. Yet further initial pulses can be controlled to reduce energy, for example by progressively increasing the period or amplitude of successive pulses. As a result an efficient and high power laser apparatus is realized.

24 Claims, 5 Drawing Sheets

U.S. PATENT DOCUMENTS

| | | | |
|---|---|---|---|
| 4,380,073 A | 4/1983 | Wayne | |
| 4,546,477 A * | 10/1985 | Richards | 372/12 |
| 4,675,872 A | 6/1987 | Popek et al. | |
| 4,796,262 A | 1/1989 | Michelangeli et al. | |
| 4,841,528 A | 6/1989 | Sipes, Jr. et al. | |
| 4,872,181 A | 10/1989 | Johnson et al. | |
| 5,127,019 A * | 6/1992 | Epstein et al. | 372/108 |
| 5,181,222 A | 1/1993 | Duarte | |
| 5,408,480 A * | 4/1995 | Hemmati | 372/10 |
| 5,453,859 A | 9/1995 | Sannohe et al. | |
| 5,631,774 A | 5/1997 | Yoshizawa | |
| 5,808,795 A | 9/1998 | Shimomura et al. | |
| 6,038,241 A | 3/2000 | von Elm et al. | |
| 6,066,127 A * | 5/2000 | Abe | 606/2 |
| 6,587,487 B1 * | 7/2003 | Yin | 372/22 |
| 6,676,402 B1 * | 1/2004 | Early et al. | 431/1 |
| 6,859,467 B1 * | 2/2005 | Adams et al. | 372/12 |
| 2002/0101900 A1 * | 8/2002 | Govorkov et al. | 372/57 |

FOREIGN PATENT DOCUMENTS

| | | |
|---|---|---|
| EP | 0370 620 A3 | 5/1990 |
| EP | 0753780 A1 | 1/1997 |
| GB | 2037064 A | 7/1980 |
| JP | 60-95988 | 5/1985 |
| WO | WO 87/04016 | 7/1987 |
| WO | WO 87/07449 | 12/1987 |
| WO | WO 02/23683 A2 | 3/2002 |

OTHER PUBLICATIONS

S.Z. Kurtev, O.E. Denchev, and S.D. Savov, Effects of thermally induced birefringence in high-output-power electro-optically Q-switched Nd:YAG lasers and their compensation, Applied Optics, vol. 32, No. 3, Jan. 20, 1993, Optical Society of America.

Chen-Hsi Change, Kurt Hirsch, and Hans Salzmann, High Repetition Rate Electrooptic Q-Switching of $Nd^{3+}$:YAG Lasers Showing Strong Optical Firefringence, IEEE Journal of Quantum Electronics, vol. QE-16, No. 4, Apr. 1980, IEEE.

* cited by examiner

PULSE LASER RESONATOR

CROSS-REFERENCE TO RELATED APPLICATIONS

This patent application is a continuation of U.S. patent application Ser. No. 10/380,655, filed on Dec. 8, 2003 (the "'655 Application"), entitled "Pulse Laser Resonator," which is a national phase filing under 35 U.S.C. 371 of International Application Number PCT/GB01/04118, which was filed on Sep. 13, 2001, and published as International Publication Number WO 02/23683 A2 on Mar. 21, 2002 (the "'683 Application"), and which in turn claims priority from Great Britain Patent Application Number 0022481.6, filed on Sep. 13, 2000 (the "'481 Application"), from Great Britain Patent Application Number 0022482.4, filed on Sep. 13, 2000 (the "'482 Application"), from Great Britain Patent Application Number 0022480.8, filed on Sep. 13, 2000 (the "'480 Application"), from Great Britain Patent Application Number 0022476.6, filed on Sep. 13, 2000 (the "'476 Application"), and from Great Britain Patent Application Number 0022478.2, filed on Sep. 13, 2000 (the "'478 Application"). The '655 Application, the '683 Application, the '481 Application, the '482 Application, the '480 Application, the '476 Application, and the '478 Application are all assigned to the assignee of the present invention, and are all hereby incorporated herein by reference.

BACKGROUND OF THE INVENTION

Field of the Invention

The present invention relates generally to laser cavities, and more particularly to electro-optical laser cavities including at least one electro-optical (EO) switch element for cavity dumping a pulsed laser output of high average power, and a pulsed laser incorporating the same, as well as a polarizer for use in such cavities. This invention further relates generally to the field of pulsed lasers, and more particularly to a switched cavity for a pulsed laser incorporating an optical element that can be switched between a high loss state and a low loss state.

Electro-optical laser cavities include a polarization selective element, for example a polarizer, and an electro-optical switch element which is operable to switch the cavity between low and high loss states, providing for hold off of the lasing action in the low loss (high Q) state and causing cavity dumping on switching to the high loss (low Q) state. The electro-optical element is operated, by the selective application of a voltage thereto, to alter the polarization state of the laser light transmitted therethrough, with the degree of change in the polarization state being related to the loss experienced by the cavity. Electro-optical elements have the particular benefit of being switchable at high rates to generate short laser output pulses, typically of the order of nanoseconds down to femtoseconds.

Existing electro-optical laser cavities have been used to deliver laser output at low average powers, typically of the order of tens of watts as achieved by flash lamp pumping a gain medium. Flash lamp pumped laser cavities are not, however, suited to delivering laser output at higher average powers as significant heat is imparted to the gain medium, which heating leads to thermal aberrations in the optical elements, in particular the gain medium, and in turn causes the depolarization of the laser light. This depolarization leads to loss at the polarization selective element, rendering the laser cavity inefficient in converting energy stored in the gain medium into output pulses of laser light. Diode pumped laser cavities also suffer from the same problem when driven to deliver laser output at higher average powers, typically about one hundred watts.

Modifications have been proposed to existing laser cavities in an attempt to compensate for the deleterious effects of polarization birefringence and allow use at higher average powers; see, for example, *Op. Lett.*, 11, pages 360 to 362 (1986), *Appl. Op.*, Vol. 32, No. 3 (1993) and *IEEE J. Quan. Elec.*, Vol. QE-16, No. 4 (1980). However, these modifications have only been applied to flash lamp pumped laser cavities for delivering output powers of tens of watts. These modifications require the use of additional optical elements, in particular polarization rotation optics, for correcting the polarization birefringence. It is, however, very difficult in practice to achieve the required correction by utilizing polarization rotation, and also the introduction of additional optical elements reduces the power of the pulsed laser output.

Another known arrangement is described in GB2037064. This document deals with correction of the effects of thermal birefringence in a laser rod including a quarter-wave plate allowing rotation of the plane of polarization through 90 degrees after reflection. This arrangement, however, is an unnecessarily complex arrangement which has an undesirably low peak power and does not allow seeding of the arrangement from another source which in turn reduces the opportunities for a stable operation of the laser.

A further arrangement is described in EP 0370620. According to this arrangement a laser medium exhibiting thermal birefringence is provided in a branched cavity and the output is taken from one of the branched arms in a Q-switching arrangement. This arrangement emits undesirably low peak powers.

It is known to use acousto-optic elements within laser cavities to switch high average power laser cavities to and from high and low loss states in order to generate pulses of the laser radiation. Such acousto-optic switching elements suffer from limitations in the shortness of the laser output pulses that can be produced, which in turn may limit the maximum peak output power of the laser pulses. It is known when using acousto-optic switching elements that measures should be taken to suppress generation of an excessively high power first pulse when switching on the laser as this may cause damage to the laser system as a whole. This has been addressed by slowly ramping up the voltage applied to the acousto-optic switching element during startup.

Measures that allow for a decrease in laser pulse duration without increasing the risk of system failure through generation of an excessively high energy laser pulse at startup are strongly advantageous. Known polarizers suffer from various problems. A polarizer can be used to separate in angle and spatially, polarizations of an input laser beam. Polarizers are characterized in part by their threshold to damage. Polarizers suitable for high peak power applications are generally constructed from a plate of silica or glass, coated with a multilayer, thin film dielectric coating. The back surface of the plate is generally left uncoated. Such a design is optimum for the separation of polarizations for a beam traveling in a pre-designated direction through the plate. However in cavities where the beam travels in both directions through the polarizing element, when the polarization is rotated by a polarization rotator, the beam is ejected from the cavity. However with a standard plate polarizer, the beam also experiences a significant reflection from the uncoated surface of the plate polarizer. This constitutes a mechanism of loss of energy from the main output beam.

One known solution to this problem is to use either a cube polarizer (or similar device), consisting of two triangular (or similar) sections, or a plate polarizer with a back surface coated with an anti-reflection (AR) coating for both p and s polarizations. Both of these options are however, complex. The AR coating for the plate polarizer is more complex than standard coatings, and as such is both challenging to coating manufacturers and reduces the damage threshold of the device.

It is thus an aim of the present invention to provide improved laser cavities for cavity dumping a pulsed laser output of high average power. It is a further aim of the present invention to provide an improved polarizer for use in laser cavities. It is a particular aim of the present invention to provide a polarizer which can withstand a high power laser and deliver a single output beam.

SUMMARY OF THE INVENTION

The disadvantages and limitations of the background art discussed above are overcome by the present invention. Accordingly, the present invention provides a laser cavity for generating a pulsed laser output, comprising: a gain medium, for example a diode pumped gain medium including a light transmission axis; at least one first optical element disposed on one side of the gain medium to return laser light emitted from the one side of the gain medium back through the gain medium; a polarization selective element disposed on the light transmission axis to the other side of the gain medium; at least one second optical element arranged to define a first optical path from the polarization selective element along which laser light of one polarization is in use directed; at least one third optical element arranged to define a second optical path from the polarization selective element along which laser light of other polarization is in use directed; and at least one electro-optical element disposed in one of the first and second optical paths and being operable to switch the polarity of the laser light transmitted therethrough such as to generate a pulsed laser output. For example first and second electro-optical elements may be disposed in the respective first and second optical paths.

In another aspect the present invention provides a laser cavity for generating a pulsed laser output, comprising: a gain medium, for example a diode pumped gain medium including a light transmission axis; at least one optical element disposed on one side of the gain medium to return laser light emitted from the one side of the gain medium back through the gain medium; a polarization selective element disposed on the light transmission axis to the other side of the gain medium; at least one further optical element arranged to define a cyclic optical path from the polarization selective element along which laser light is in use directed in one of two directions depending on the polarization of the laser light; and at least one electro-optical element disposed in the optical path and being operable to switch the polarity of the laser light transmitted therethrough such as to generate a pulsed laser output.

Preferred aspects of the invention are further set out in the claims.

Preferably the path between the gain medium and said first optical element is uninterrupted by polarization altering elements. As a result the design is significantly simplified.

Yet further preferably the electro-optical element is arranged to dump the cavity on operation. The cavity dumping arrangement allows an especially high peak power output.

Preferably the first and second optical paths are detuned. Because the paths are of different lengths the effects of interference between the two arms are substantially mitigated, especially where the cavity is operated in the absence of seeding which improves the characteristics of the output beams in terms of spatial homogeneity and temporal and directional stability.

The invention in this preferred form does not correct for thermal birefringence but instead provides a laser that has thermal birefringence in the gain medium for a polarization switched application. This enables a greater peak power to be emitted from the laser, as well as enabling seeding of the laser with a pulsed or continuous wave laser source (regenerative amplification). This can lead to a more stable operation of the laser especially at high repetition rates. The omission of a polarization altering element is particularly advantageous where the beam is many times (for example greater than ten times) transform limited.

Preferably the pulsed laser output is output from the polarization selective element. This arrangement allows cavity dumping and hence surprisingly high peak powers. In addition a single output pulse can be obtained even if the cavity is seeded by another short pulsed laser source.

The invention also extends to a polarizer including a first polarization separating optical surface, for example having a dielectric film coating, and second and third optical surfaces through which laser light is in use transmitted.

The present invention also provides a laser cavity including the above-described polarizer.

The polarizer is preferably prism-shaped, for example having a triangular cross-section. The triangular polarizer enables the application of a simple dielectric antireflection coating on two surfaces, and a standard polarization separating coating on the other. The two surfaces that have a simple AR coatings are aligned near normal to the laser beam. The coating can be a single layer, and still reduce loss inducing reflections to a useable level. The polarizer can be used in the various cavities described herein.

The present invention also provides a laser cavity for generating a pulsed laser output, comprising: a gain medium including a light transmission axis; at least one optical element disposed on one side of the gain medium to return laser light emitted from the one side of the gain medium back through the gain medium; a polarization selective element disposed on the light transmission axis to the other side of the gain medium; at least one further optical element arranged to define a cyclic optical path from the polarization selective element along which laser light is in use directed in one of two directions depending on the polarization of the laser light; and at least one electro-optical element formed of beta barium borate disposed in the optical path and being operable to switch the polarity of the laser light transmitted therethrough such as to generate a pulsed laser output.

The present invention further provides a laser cavity for generating a pulsed laser output, comprising: a gain medium including a light transmission axis; at least one first optical element disposed on one side of the gain medium to return laser light emitted from the one side of the gain medium back through the gain medium; a polarization selective element, for example the above described polarizer, disposed on the light transmission axis to the other side of the gain medium; at least one second optical element arranged to define a first optical path from the polarization selective element along which laser light of one polarization is in use directed; at least one third optical element arranged to define a second optical path from the polarization selective element along which laser light of other polarization is in use directed; and at least one electro-optical element formed of beta barium borate disposed in one of the first and second optical paths and being operable to switch the polarity of the laser light transmitted therethrough such as to generate a pulsed laser output.

Viewed from one aspect the present invention provides a pulsed laser comprising: a laser cavity; a laser gain medium within said laser cavity; an optical switch element operable to change a light loss level of said laser cavity and laser gain medium between a first loss state in which laser output is inhibited and second loss state in which laser output is not inhibited such that a laser pulse is generated; and a pulse controller operable to provide a control signal to said switch element to control repeated switching between said first loss state and said second loss state to trigger generation of a stream of laser pulses; wherein upon initiation of generation of laser pulses, said pulse controller generates control signals that progressively increase a period for which said laser cavity and laser gain medium are in said second loss state or progressively change said cavity light loss level of said second loss state towards a steady state second loss period such that laser pulse energy at startup is reduced compared to if said steady state second loss period or level was used immediately upon startup. By "steady state" is meant a regular, non-changing period.

The invention recognizes that suppression of a potentially damaging first pulse may be achieved by progressively increasing the period for which the low (second) loss state is adopted up to a steady state low loss period. In this way, the initial pulses produced are clipped such that the energy that they contain is reduced.

In preferred embodiments the minimum period of the second loss state adopted at startup is too low to allow lasing to occur. In this way, a smooth and progressive startup of lasing may be aided.

While it will be appreciated that the technique of gradually increasing the second loss state period may be applied to different sorts of optical switch elements, including both acousto-optic and electro-optic switch elements, the invention is particularly well suited for use with electro-optic switch elements as these are able to change state at high speed and so achieve a controllable and repeatable clipping effect of the initial pulses.

While the optical switch elements could contain many different components, preferred embodiments are ones in which the optical switch element comprises one or more of at least one mirror, polarization-modifying optics, focusing or diverging optics, beam-profiling optics, an electro-optic cell and an acousto-optic cell. These elements allow compensation for other characteristics of the laser system to be made while still providing the desired suppression of initial startup pulses having an excessive energy.

Viewed from yet another aspect the present invention provides a method of operating a pulsed laser having a laser cavity, a laser gain medium within said laser cavity, an optical switch element operable to change a light loss level of said laser cavity and laser gain medium between a first loss state in which laser output is inhibited and a second loss state in which laser output is not inhibited such that a laser pulse is generated, and a pulse controller operable to provide a control signal to said optical switch element to control repeated switching between said first loss state and said second loss state to trigger generation of a stream of laser pulses; said method comprising the step of: upon initiation of generation of laser pulses, generating control signals that progressively increase a period for which said laser cavity and laser gain medium are in said second loss state towards a steady state second loss period such that laser pulse energy at startup is reduced compared to the situation if said steady state second loss period was used immediately upon startup.

Viewed from one aspect the present invention provides a pulsed laser comprising: a laser cavity; a laser gain medium within said laser cavity; an electro-optic switch element operable to change a light loss level of said laser cavity and laser gain medium between a first loss state in which laser output is inhibited and second loss state in which laser output is not inhibited such that a laser pulse is generated; and a pulse controller operable to provide a control signal to said electro-optic switch element to control repeated switching between said first loss state and said second loss state to trigger generation of a stream of laser pulses; wherein upon initiation of generation of laser pulses, said pulse controller generates control signals that progressively change said cavity light loss level of said second loss state towards a steady state second loss level such that laser pulse energy at startup is reduced compared to the situation if said steady state second loss level was used immediately upon startup.

The invention uses an electro-optic switch element as compared with an acousto-switch element. Such an electro-optic switch element operates in a fundamentally different physical manner to bring about its switching and is able to produce much shorter laser pulses. However, in order to guard against excessively high energy pulses at startup, the invention provides a pulse controller that progressively decreases the low (second) loss state level from a startup low loss state level towards a steady state low loss state level in such a way that the laser pulse energy at startup is reduced to inhibit excessively high energy initial pulses while not imposing a limitation upon the energy level of the subsequent pulses that may be produced.

A particularly safe way in which the laser can be started up is one in which the electro-optic switch element is controlled at startup to provide a light loss level that is too high even in the low loss state to allow lasing and then progressively to decrease this low loss state level such that lasing will start in a controlled manner.

In addition to altering the loss level states between which the electro-optic switch element is moved upon startup, preferred embodiments also act to control the period for which the electro-optic switch element remains in the second loss state to gradually increase upon startup in a manner that suppresses generation of high energy initial pulses.

In preferred embodiments the suppression of excessively high energy initial pulses is improved when the minimum initial duration of the second loss state at startup is sufficiently short to not allow a laser pulse to be generated. This low loss state duration can then be gradually increased so that lasing is commenced in a controlled manner.

It will be appreciated that the electro-optic switch element could take many forms. However, preferred levels of control and matching with other characteristics of a high-power system may be achieved when the electro-optic switch element comprises one or more of at least one mirror, polarization-modifying optics, focusing optics, and beam-profiling optics.

It will be appreciated that the pulse controller as well as serving to control laser startup to avoid system damage may also be operable to control the pulse frequency of the laser pulses that are generated.

Viewed from another aspect the present invention provides a method of operating a pulsed laser having a laser cavity, a laser gain medium within said laser cavity, an electro-optic switch element operable to change a light loss level of said laser cavity and laser gain medium between a first loss state in which laser output is inhibited and a second loss state in which laser output is not inhibited such that a laser pulse is generated, and a pulse controller operable to provide a control signal to said electro-optic switch element to control repeated switching between said first loss state and said second loss state to trigger generation of a stream of laser pulses; said method comprising the step of: upon initiation of generation of laser pulses, generating control signals that progressively change said cavity light loss level of said second loss state towards a steady state second loss level such that laser pulse energy at startup is reduced compared to if said steady state second loss level was used immediately upon startup.

DESCRIPTION OF THE DRAWINGS

These and other advantages of the present invention are best understood with reference to the drawings, in which.

DETAILED DESCRIPTION OF THE PREFERRED EMBODIMENT

Figure 1:
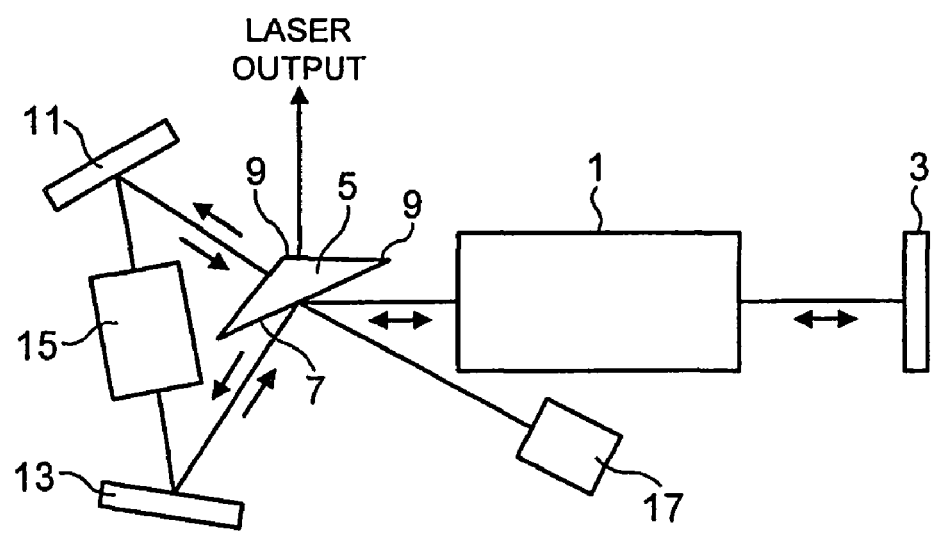
FIG. 1 is a schematic illustration of a laser cavity in accordance with a first embodiment of the present invention.
Figure 2:
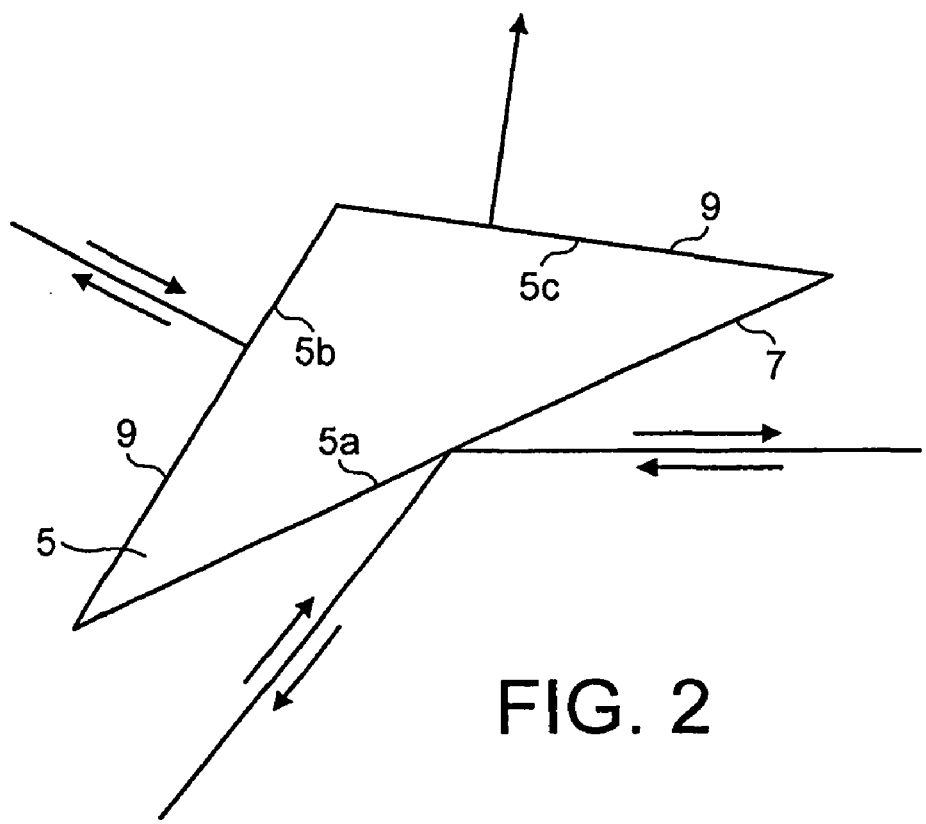
FIG. 2 is a schematic illustration of a prism-shaped polarizer in accordance with a preferred embodiment of the present invention.

FIG. 1 illustrates a laser cavity in accordance with a first embodiment of the present invention for cavity dumping a pulsed laser output of high average power.

The laser cavity includes a diode pumped gain medium 1 having a light transmission axis extending therethrough.

The laser cavity further includes a first optical element 3, in this embodiment a high reflector, disposed on the light transmission axis to one side of the gain medium 1 to reflect laser light emitted from the one side of the gain medium 1 back through the gain medium 1.

The laser cavity further includes a polarization selective element 5, in this embodiment a prism-shaped polarizer including coated optical surfaces 5a, 5b, 5c, disposed on the light transmission axis to the other side of the gain medium 1. In this embodiment one, the first, optical surface 5a faces the gain medium 1 and includes a thin dielectric film coating 7. The other, second and third optical surfaces 5b, 5c are each angled substantially normal to the laser light transmitted therethrough and include anti-reflective coatings 9, 9. In a preferred embodiment the bandwidth of the laser light is maintained such as to be sufficiently narrow that dispersion by the polarizer 5 of differing wavelengths in different directions does not impact significantly on the laser operation or the spatial beam quality. In an alternative embodiment the polarization selective element 5 could be a plane parallel plate polarizer which includes a thin dielectric film coating on the optical surface facing the gain medium 1 and an anti-reflective coating on the other optical surface. Although a plane parallel plate polarizer could be used as the polarization selective element 5, the prism-shaped polarizer is clearly advantageous over the plane parallel plate polarizer. Available information confirms that, as compared to a standard plane parallel plate polarizer with an anti-reflective coating on the back surface, the damage threshold to laser peak power density can be increased by about 20%, and, in comparison to a standard plane parallel plate polarizer without an anti-reflective coating on the back surface, the useful laser power transmitted is increased by about 18%.

The laser cavity further includes a second optical element 11, in this embodiment a high reflector, arranged to reflect laser light to or from the second optical surface 5b of the polarizer 5.

The laser cavity further includes a third optical element 13, in this embodiment a high reflector, arranged to reflect laser light to or from both the second optical element 11 and the first optical surface 5a of the polarizer 5. In this embodiment the polarizer 5 and the first and second optical elements 11, 13 define a triangular optical path about which laser light is cyclically directed in the high Q state. It should be understood, however, that other optical path shapes could be employed. For example, a square optical path could be defined by the inclusion of a further optical element.

The laser cavity further includes an electro-optical switch element 15 located on the optical path between the second and third optical elements 11, 13 and being operable to switch, that is, rotate, the polarization of the laser light transmitted therethrough through 90 degrees. In this embodiment the electro-optical element 15 is formed of beta barium borate (BBO) which exhibits less thermal distortion and also enables higher switching rates as compared to the conventional materials of $KH_2PO_4$ (KDP) and $KD_2PO_4$ (KD*P).

The laser cavity further includes a seed light source 17 operable in one mode of operation to seed the gain medium 1 with laser light, either as a pulse or as a continuous wave (CW). In this embodiment the laser cavity can be seeded through the polarizer 5. In other embodiments the laser cavity could be seeded through or off any of the optical elements. In another mode of operation the gain medium 1 is driven from the noise therein, referred to as spontaneous decay.

Operation of the laser cavity in cavity dumping a pulsed laser output of high average power will now be described hereinbelow.

In one mode of use, the electro-optical element 15 is switched such that the laser cavity is in the high Q state, that is, the laser light is trapped in the cavity, and the flux of the laser light in the cavity increases from noise. At or near the peak of the laser flux, the electro-optical element 15 is switched, in a time period less than or of the order of the time period of the cavity round trip, such that the cavity is in the low Q state and a pulse of laser light is dumped from the cavity.

In another mode of use, the electro-optical element 15 is switched such that the laser cavity is in the high Q state and the cavity is seeded by the seed light source 17. At or near the peak of the flux of the laser light in the laser cavity, the electro-optical element 15 is switched, in a time period less than or of the order of the time period of the cavity round trip, such that the cavity is in the low Q state and a pulse of laser light is dumped from the cavity. The advantages of seeding the cavity are to improve the spatial beam quality, deliver an output pulse of shorter duration, and provide control of the output pulse profile in time by enabling control of the seed input pulse profile in time.

Figure 3:
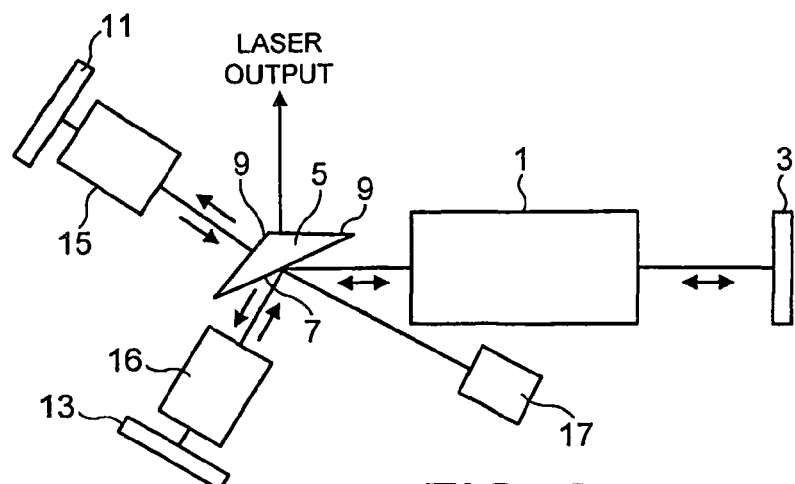
FIG. 3 is a schematic illustration of a laser cavity in accordance with a second embodiment of the present invention.

FIG. 3 schematically illustrates a laser cavity in accordance with a second embodiment of the present invention for cavity dumping a pulsed laser output of high average power.

The laser cavity includes a diode pumped gain medium 1 having a light transmission axis extending therethrough.

The laser cavity further includes a first optical element 3, in this embodiment a high reflector, disposed on the light transmission axis to one side of the gain medium 1 to reflect laser light emitted from the one side of the gain medium 1 back through the gain medium 1.

The laser cavity further includes a polarization selective element 5, in this embodiment a prism-shaped polarizer including coated optical surfaces 5a, 5b, 5c, disposed on the light transmission axis to the other side of the gain medium 1. In this embodiment one, the first, optical surface 5a faces the gain medium 1 and includes a thin dielectric film coating 7. The other, second and third, optical surfaces 5b, 5c are each angled substantially normal to the laser light transmitted therethrough and include anti-reflective coatings 9, 9. In a preferred embodiment the bandwidth of the laser light is maintained such as to be sufficiently narrow that dispersion by the polarizer 5 of differing wavelengths in different directions does not impact significantly on the laser operation or the spatial beam quality. In an alternative embodiment the polarization selective element 5 could be a plane parallel plate polarizer which includes a thin dielectric film coating on the optical surface facing the gain medium 1 and an anti-reflective coating on the other optical surface. Although a plane parallel plate polarizer could be used as the polarization selective element 5, the prism-shaped polarizer has clear advantages over the plane parallel plate polarizer. As mentioned hereinabove, available information has confirmed that, as compared to a standard plane parallel plate polarizer with an anti-reflective coating on the back surface, the damage threshold to laser peak power density can be increased by about 20%, and, in comparison to a standard plane parallel plate polarizer without an antireflective coating on the back surface, the useful laser power transmitted is increased by about 18%.

The laser cavity further includes a second optical element 11, in this embodiment a high reflector, arranged to reflect laser light back to the second optical surface 5b of the polarizer 5.

The laser cavity further includes a third optical element 13, in this embodiment a high reflector, arranged to reflect laser light back to the first optical surface 5a of the polarizer 5. In this embodiment the polarizer 5 and respective ones of the second and third optical elements 11, 13 define separate optical paths as ones of a fork. In this embodiment the second and third optical elements 11, 13 are arranged such that the path lengths of the optical paths differ i.e. are de-tuned for example by the order of a few centimeters. The advantage of arranging the optical paths to be of different length is that interference between the laser light of different polarity traveling through each optical path is avoided, leading to improved output spatial quality and temporal and direction stability. The path lengths can be closely matched in laser cavities predisposed to higher output spatial quality, for example with less thermal loading in the gain medium 1, without immediate loss of spatial quality. In another embodiment the path lengths could be the same.

The laser cavity further includes first and second electro-optical switch elements 15, 16 located in respective ones of the optical paths between the second and third optical elements 11, 13 and the polarizer 5 and each being operable to switch, that is, rotate, the polarization of the laser light transmitted therethrough through 90 degrees. In this embodiment the electro-optical elements 15,16 are each formed of beta barium borate (BBO) which, as mentioned hereinabove, exhibits less thermal distortion and also enables higher switching rates as compared to the conventional materials of $KH_2PO_4$ (KDP) and $KH_2PO_4$ (KD*P).

The laser cavity further includes a seed light source 17 operable in one mode of operation to seed the gain medium 1 with laser light, either as a pulse or as a continuous wave (CW). In this embodiment the laser cavity can be seeded through the polarizer 5. In other embodiments the laser cavity could be seeded through or off any of the optical elements. In another mode of operation the gain medium 1 is driven from the noise therein, referred to as spontaneous decay.

Operation of the laser cavity in cavity dumping a pulsed laser output of high average power will now be described hereinbelow.

In one mode of use, the electro-optical elements 15, 16 are switched such that the laser cavity is in the high Q state, that is, the laser light is trapped in the cavity, and the flux of the laser light in the cavity increases from noise. At or near the peak of the laser flux, the electro-optical elements 15, 16 are switched, in a time period less than or of the order of the time period of the cavity round trip, such that the cavity is in the low Q state and a pulse of laser light is dumped from the cavity.

In another mode of use, the electro-optical elements 15, 16 are switched such that the laser cavity is in the high Q state and the cavity is seeded by the seed light source 17. At or near the peak of the flux of the laser light in the cavity, the electro-optical elements 15, 16 are switched, in a time period less than or of the order of the time period of the cavity round trip, such that the cavity is in the low Q state and a pulse of laser light is emitted from the cavity. As mentioned hereinabove, the advantages of seeding the cavity are to improve the spatial beam quality, deliver an output pulse of shorter duration, and provide control of the output pulse profile in time by enabling control of the seed input pulse profile in time.

Figure 4:
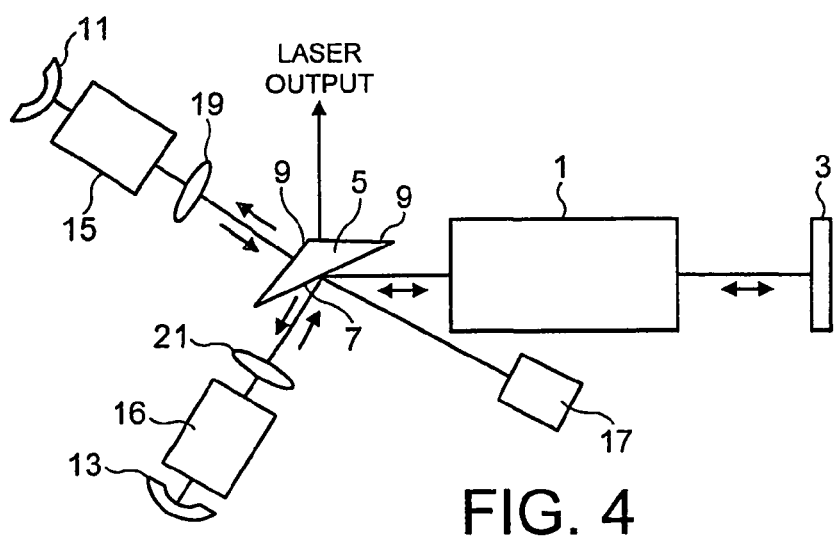
FIG. 4 is a schematic illustration of a laser cavity in accordance with a third embodiment of the present invention.

FIG. 4 illustrates a laser cavity in accordance with a third embodiment of the present invention for cavity dumping a pulsed laser output of high average power.

The laser cavity of this embodiment is very similar to the laser cavity of the above-described second embodiment, and thus, in order to avoid unnecessary duplication of description, only the differences will be described in detail.

This embodiment differs only in that the second and third optical elements 11, 13 include stigmatism imparting optical elements, in this embodiment astigmatic mirrors, and that the laser cavity further includes fourth and fifth, stigmatism imparting optical elements 19, 21, in this embodiment astigmatic lenses, disposed in respective ones of the optical paths between the polarizer 5 and the respective electro-optical element 15, 16. In the context of the present invention, it is meant by stigmatism imparting that a stigmatism is imparted to non-stigmatic light and the stigmatism of stigmatic light is altered. In other embodiments the stigmatism imparting optical elements could include ones of cylindrical or tilted lenses and mirrors. Operation of the laser cavity is the same as for the above-described second embodiment. By separately compensating for the differing astigmatism imparted by the gain medium 1 to the horizontal and vertical polarizations, a laser output is achieved which is free of astigmatism and does not require the use of two matched gain media and an optical rotator, such as a polarization rotator formed preferably of quartz. The latter compensation technique is generally considered to be incomplete when applied to real laser cavities in relying on the gain media having identical lensing characteristics and the optical ray passing the separate gain media in exactly the same manner. As will be appreciated, these conditions are difficult to meet in real laser cavities.

Figure 5:
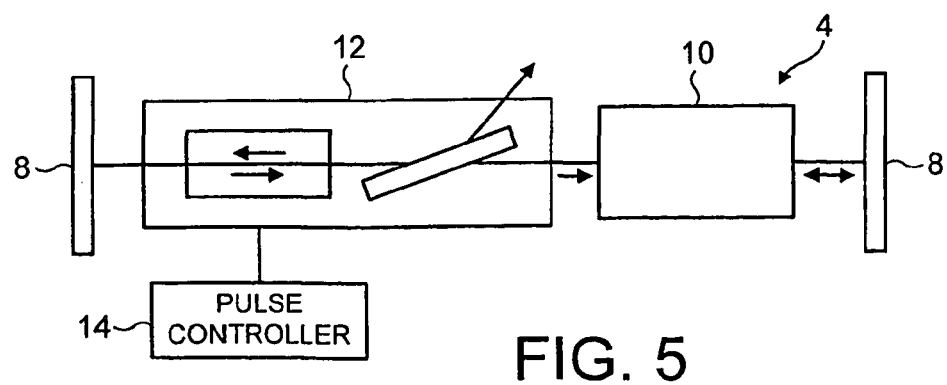
FIG. 5 is a schematic illustration of a pulsed laser.

FIG. 5 schematically illustrates a pulsed laser 2 having a laser cavity 4. The laser cavity 4 is bounded by high reflectors 6 and 8. (The high reflector 8 could be replaced with a partial reflector in certain designs to stop the cavity flux becoming too high.) A pumped laser gain medium 10 is disposed within the laser cavity 4. An electro-optic switch element 12 is also disposed within the laser cavity 4. The electro-optic switch element 12 also includes a polarization element which can be used to direct radiation out of the laser cavity 4 when it is desired to "dump" the cavity. A pulse controller 14 coupled to the electro-optic switching element 12 serves to switch the electro-optic switching element 12 between a high loss state and a low loss state.

In the case of the use of an acousto-optic switch element (which creates a diffraction grating from internal acoustic waves that diffracts the radiation so causing a loss) in place of the electro-optic switch element 12, a partial reflector would replace the high reflector 8 to provide an exit for radiation from the laser cavity 4.

In steady state operation, the high loss state of the electro-optic switch element 12 is such that lasing within the laser cavity 4 is inhibited while the low loss state of the electro-optic switch element 12 is such that lasing within the laser cavity 4 will occur. The rapid response of the electro-optic switch element 12 in moving between these two different loss states enables very short laser pulses to be generated.

In the case of the use of the electro-optic switching element 12, highly reflecting mirror 6 and 8 are used at both ends of the cavity and there is the added advantage of being able to seed and dump the cavity to produce shorter pulses. If built up from laser noise, there is a constant laser flux everywhere in the laser cavity 4 until the electro-optic switch element is switched, when the cavity flux can be dumped (output) in a round trip time, hence creating an output pulse. If seeded, a pulse goes around in the cavity until one chooses to dump it out, which may enable an even shorter laser pulse to be produced.

Figure 6:
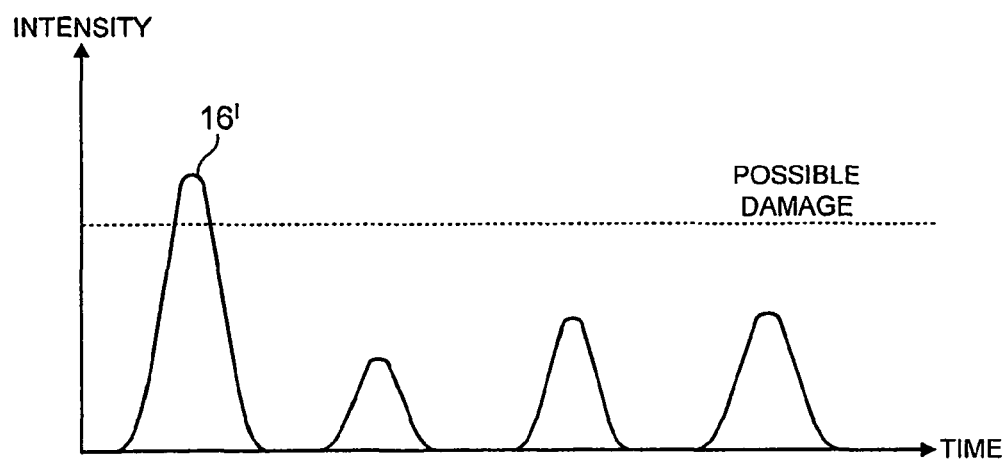
FIG. 6 is a schematic illustration of the generation of an excessively high energy laser pulse upon startup.

FIG. 6 schematically illustrates the possibility of laser damage that can occur with an uncontrolled startup. In the example illustrated, the first laser pulse 16 that is generated may have a peak intensity/power that is sufficient to produce damage to the system as a whole. This excessively high power level of the first pulse may be the result of a greater population inversion within the laser gain medium 10 at startup than in the steady start or other characteristics of the pulsed laser system 2 that vary at startup compared to the steady state.

As shown in the example, subsequent laser pulses generated are below the level at which damage may occur and eventually settle to a quasi-constant level as the pulsed laser system 2 equalizes to its steady state condition.

Figure 7:
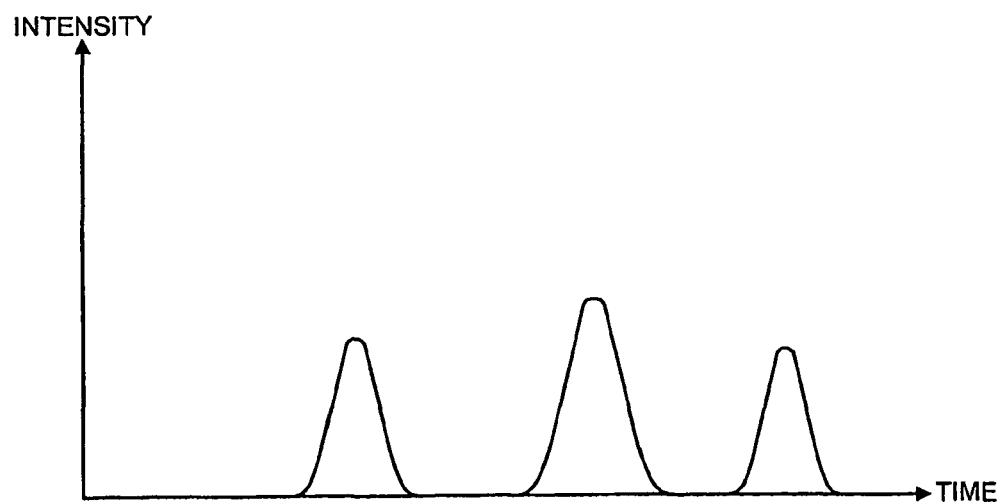
FIG. 7 is an illustration of a first embodiment of the present invention by which control of the switching between a high loss state and a low loss state of the cavity during startup can be used to suppress generation of an excessively high energy initial pulse.
Figure 7:
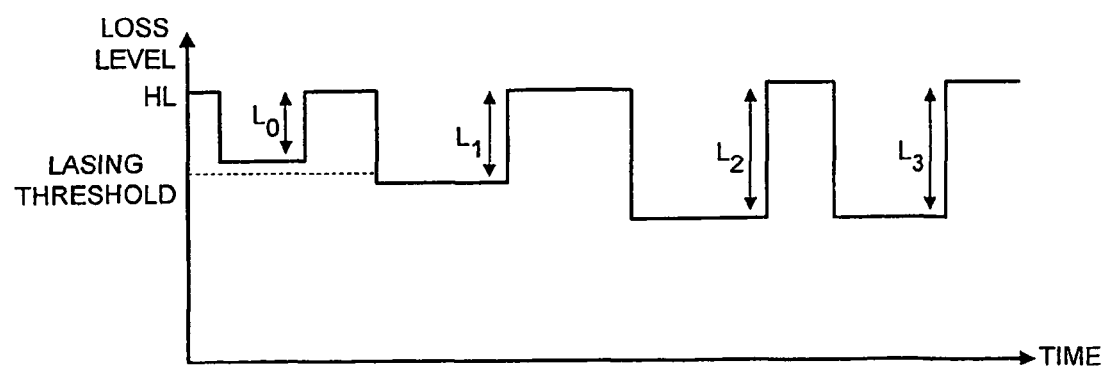

FIG. 7 illustrates a first technique by which the pulse controller 14 can modify the control pulses (control voltages, which may be negative) supplied to the electro-optic switch element 12 in a manner that reduces the likelihood of generation of an excessively high energy initial pulse. As shown in the lower graph, the loss level associated with the electro-optic switch element 12 is switched between a high loss level HL and a low loss level beneath this. The high loss level HL is above a lasing threshold such that lasing is inhibited by the degree of loss within the laser cavity 4 when the electro-optic switch 12 has this high loss level HL. At startup, the first low loss level state adopted has a level $L_0$ beneath the high loss level HL. This first low loss level state is insufficiently low to allow lasing to occur. Subsequent pulsed low loss level states adopted decrease the low loss state level progressively through the lasing threshold such that lasing gradually becomes sustainable until a steady state low loss level state $L_3$ is reached. In the example illustrated, the progressive decrease in the low loss level is shown as occurring relatively rapidly whereas in practice this may take place over many more laser pulse cycles.

Figure 8:
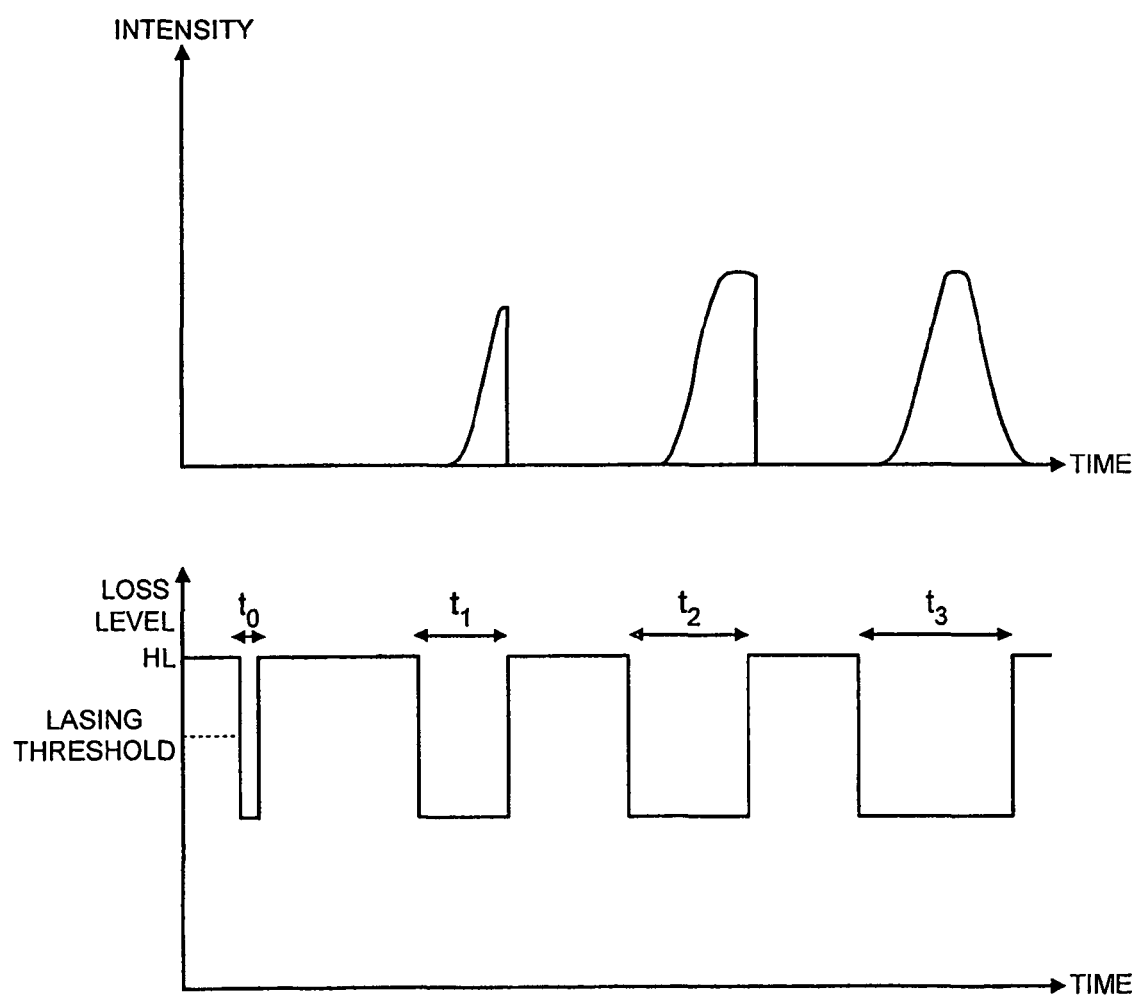
FIG. 8 is an illustration of a second embodiment of the present invention by which control of the switching between a high loss state and a low loss state of the cavity during startup can be used to suppress generation of an excessively high energy initial pulse.

FIG. 8 illustrates an alternative way in which the pulse controller 14 may generate control pulses that suppress the generation of an excessively high energy initial pulse. In this embodiment the period for which the control pulse replaces the electro-optic switch element 12 in the low loss state is progressively increased from a period $t_0$ to a steady state period $t_3$. The initial low loss state period $t_0$ is insufficient to allow lasing to occur. As this period gradually increases, laser flux starts to build up, but is clipped in comparison to what would be their normal duration by return of the laser cavity 4 to a high loss state using the electro-optic switch 12 prior to the energy stored in the laser gain medium 10 being depleted by the generation of the laser pulse. Again, the increase in the low loss state period illustrated in FIG. 4 takes place over many fewer laser pulse cycles than may in practice be utilized.

Figure 9:
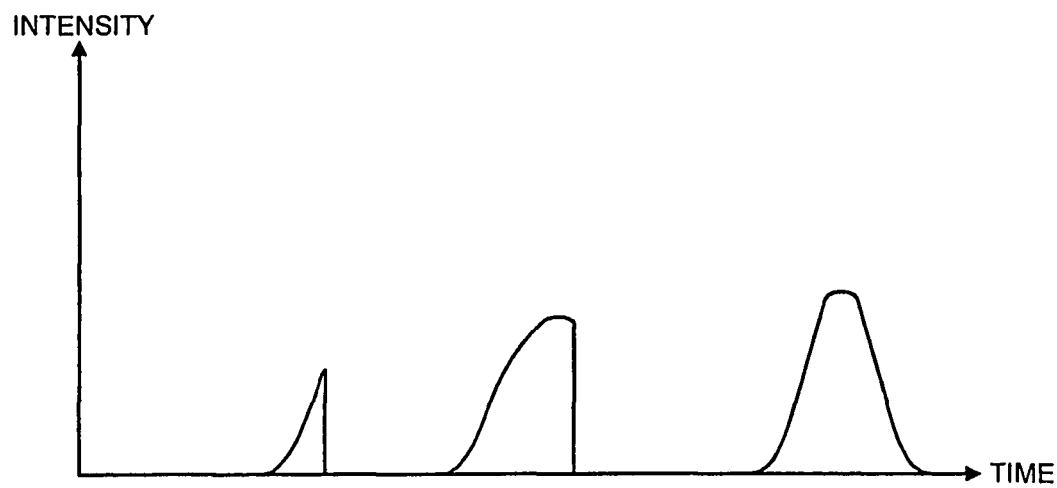
FIG. 9 is an illustration of a third embodiment of the present invention by which control of the switching between a high loss state and a low loss state of the cavity during startup can be used to suppress generation of an excessively high energy initial pulse.
Figure 9:
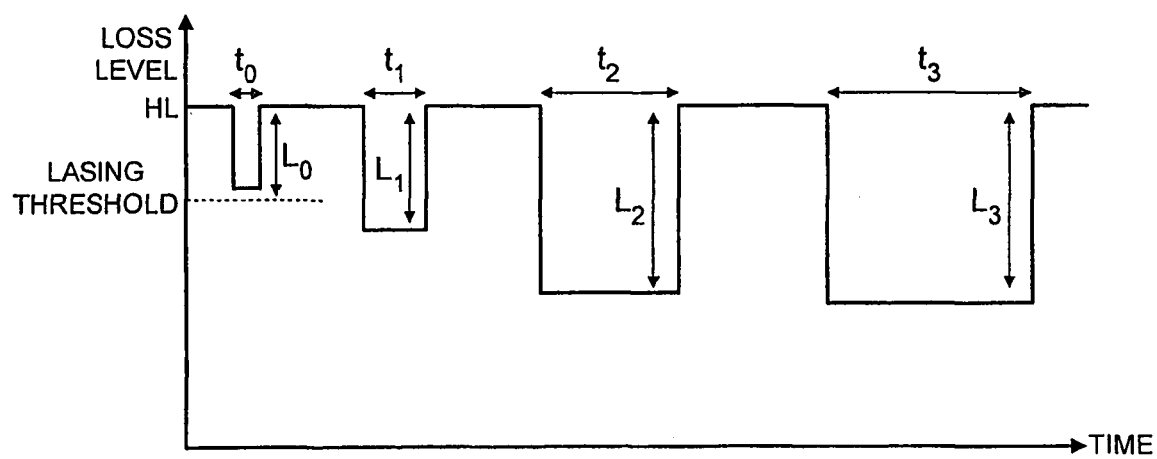

FIG. 9 illustrates a third embodiment in which a combination of the techniques of FIGS. 7 and 8 is used. In this embodiment both the level of the low loss state is progressively decreased and the duration of the low loss state progressively increased in a manner whereby lasing is initially not sustainable and then progressively becomes sustainable in a manner in which the maximum pulse energy is not sufficient to render damage to the laser system 2.

Figure 10:
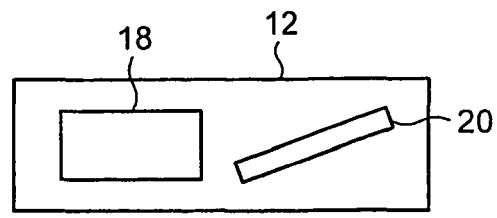
FIG. 10 is a schematic illustration of an electro-optical switch element.

FIG. 10 schematically illustrates an example electro-optic switching element 12 in more detail. This electro-optic switch incorporates an electro-optic cell 18, containing a material that exhibits the Pockels effect (such as KDP, $LiNO_3$ or BBO), and a polarization selective element 20. The electro-optic switch switches the polarization of light passing through it in dependence upon a control voltage applied by the pulse controller 14.

An electro-optic cell can switch slowly (order of many round trips), in which case it can be used in a similar way to an acousto-optic switch. There is still an advantage of an electro-optic switch though, in that it can hold off greater cavity gain from lasing.

If switched fast, electro-optic cells enable short pulse production (a few nanoseconds is possible), even for high average power laser emissions. They also enable seeding. Seeding may give the advantage of improved spatial beam quality as well as a shorter output pulse.

It will be appreciated that in the embodiments of FIGS. 4 and 5, the electro-optic switch 12 could be replaced by an acousto-optic switch using the same control techniques to stop damaging pulses on start up.

In one modification of the laser cavity of the above-described first embodiment, the single electro-optical element 15 could be replaced by two electro-optical elements separated by an optical rotator, typically a polarization rotator preferably formed of quartz. This arrangement compensates for the polarization birefringence within electro-optical elements and also partially within the gain medium 1.

In one modification of the laser cavity of the above-described second embodiment, one of the electro-optical elements 15, 16 could be omitted from one optical path. In operation, the laser light of the polarity which travels through the one optical path including no electro-optical element is eventually depolarized sufficiently by the gain medium 1 as to travel through the other optical path and be controlled by the electro-optical element in that other path either to remain in the laser cavity or be switched out. This modified laser cavity offers the particular advantage that the laser output is of a single polarization state. A disadvantage is that the output pulse may be longer in duration.

Although the foregoing description of the pulse laser resonator of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A laser cavity for generating a pulsed laser output, comprising:
   a gain medium including a light transmission axis;
   at least one first optical element disposed on one side of the gain medium to return laser light emitted from the one side of the gain medium back through the gain medium;
   a polarization selective element disposed on the light transmission axis to the other side of the gain medium;
   at least one second optical element arranged to define a first optical path from the polarization selective element along which laser light of one polarization is in use directed;
   at least one third optical element arranged to define a second optical path from the polarization selective element along which laser light of other polarization is in use directed; and
   at least one electro-optical element disposed in one of the first and second optical paths and being operable to switch the polarity of the laser light transmitted therethrough such as to generate a pulsed laser output;
   wherein the at least one first optical element comprises a reflective element;
   wherein the polarization selective element comprises a polarizer;
   wherein the polarizer includes a first optical surface which includes a dielectric film coating and is in optical communication with the other side of the gain medium and the at least one third optical element, a second optical surface which is in optical communication with the at least one second optical element, and a third optical surface which is the surface through which laser output pulses are in use dumped; and
   wherein the second and third optical surfaces of the polarizer are arranged such that the laser light transmitted therethrough is not more than ten degrees from a direction normal to the respective optical surface.

2. A laser cavity as defined in claim 1, wherein the at least one electro-optical element is formed of beta barium borate.

3. A laser cavity as defined in claim 1, wherein the polarizer comprises a plane parallel plate polarizer.

4. A laser cavity as defined in claim 3, wherein the polarizer includes an anti-reflective coating on the back surface thereof.

5. A laser cavity as defined in claim 1, wherein the polarizer comprises a prism-shaped polarizer.

6. A laser cavity as defined in claim 1, wherein the second and third optical surfaces of the polarizer are arranged such that the laser light transmitted therethrough is substantially normal to the respective optical surface.

7. A laser cavity as defined in claim 1, wherein the second and third optical surfaces of the polarizer include an anti-reflective coating.

8. A laser cavity as defined in claim 1, further comprising at least one further electro-optical element disposed in the other of the first and second optical paths and being operable in conjunction with the at least one electro-optical element to switch the polarity of the laser light transmitted therethrough.

9. A laser cavity as defined in claim 8, wherein the at least one further electro-optical element is formed of beta barium borate.

10. A laser cavity as defined in claim 1, wherein at least one of the first and second optical paths includes at least one stigmatism imparting optical element.

11. A laser cavity as defined in claim 10, wherein at least one of the at least one second and at least one third optical elements is a stigmatism imparting optical element.

12. A laser cavity as defined in claim 10, wherein both the first and second optical paths include at least one stigmatism imparting optical element.

13. A laser cavity as defined in claim 12, wherein the at least one second and at least one third optical elements are stigmatism imparting optical elements.

14. A laser cavity as defined in claim 1, wherein the at least one second optical element comprises a reflective element.

15. A laser cavity as defined in claim 1, wherein the at least one third optical element comprises a reflective element.

16. A laser cavity as defined in claim 1, further comprising a seed light source for seeding the cavity with laser light.

17. A laser cavity as defined in claim 1, wherein the gain medium is a diode pumped gain medium.

18. A laser cavity as defined in claim 1, wherein the path between the gain medium and said first optical element is uninterrupted by polarization altering elements.

19. A laser cavity as defined in claim 1, wherein the electro-optical element is arranged to dump the cavity on operation.

20. A laser cavity as defined in claim 1, wherein the first and second optical paths are de-tuned.

21. A laser cavity as defined in claim 1, wherein the pulsed laser output is output from the polarization selective element.

22. A laser cavity for generating a pulsed laser output, comprising:
   a gain medium including a light transmission axis;
   a first reflective element disposed on one side of the gain medium to return laser light emitted from the one side of the gain medium back through the gain medium;
   a polarizer disposed in the light transmission axis on the other side of the gain medium, the polarizer having first, second, and third optical surfaces, the first optical surface including a dielectric film coating and being in optical communication with the other side of the gain medium, the third optical surface being the surface through which laser output pulses are dumped;
   a second reflective element arranged to define a first optical path from the polarizer along which laser light of one polarization is directed, the second optical surface being in optical communication with the second reflective element;
   a third reflective element arranged to define a second optical path from the polarizer along which laser light of another polarization is directed, the first optical surface also being in optical communication with the third reflective element; and
   at least one electro-optical element disposed in one of the first and second optical paths and being operable to switch the polarity of the laser light transmitted therethrough to generate a pulsed laser output.

23. A laser cavity as defined in claim 22, wherein the second and third optical surfaces of the polarizer being arranged such that laser light transmitted therethrough is not more than ten degrees from a direction normal to the respective optical surface.

24. A laser cavity as defined in claim 22, further comprising at least one further electro-optical element disposed in the other of the first and second optical paths and being operable in conjunction with the at least one electro-optical element to switch the polarity of the laser light transmitted therethrough.

* * * * *